United States Statutory Invention Registration [19]

[11] Reg. Number: H91

Gabor et al. [45] Published: Jul. 1, 1986

[54] SAFETY APPARATUS FOR NUCLEAR REACTOR TO PREVENT STRUCTURAL DAMAGE FROM OVERHEATING BY CORE DEBRIS

[75] Inventors: John D. Gabor, Western Springs; John C. Cassulo, Stickney; Dean R. Pedersen, Naperville; Louis Baker, Jr., Downers Grove, all of Ill.

[73] Assignee: The United States of America as represented by the United States Department of Energy, Washington, D.C.

[21] Appl. No.: 777,875

[22] Filed: Sep. 20, 1985

Related U.S. Application Data

[63] Continuation of Ser. No. 472,368, Mar. 4, 1983, abandoned.

[51] Int. Cl.[4] ..... G21C 9/00

[52] U.S. Cl. ..... 376/280

[56] References Cited

U.S. PATENT DOCUMENTS

| | | | |
|---|---|---|---|
| 3,964,966 | 6/1976 | Lampe | 376/280 |
| 4,003,785 | 1/1977 | Rau et al. | 376/280 |
| 4,113,560 | 9/1978 | Driscoll et al. | 376/280 |
| 4,130,459 | 12/1978 | Parker et al. | 376/280 |
| 4,252,612 | 2/1981 | Cooper et al. | 376/280 |
| 4,280,872 | 7/1981 | Ferrari et al. | 376/280 |
| 4,300,983 | 11/1981 | Donne et al. | 376/280 |
| 4,412,969 | 11/1983 | Tillbrook et al. | 376/280 |

FOREIGN PATENT DOCUMENTS

| | | | |
|---|---|---|---|
| 5162296 | 5/1976 | Japan | 376/280 |

OTHER PUBLICATIONS

"Post Accident Debris Cooling", Proc. of the Fifth Post Accident Heat Removal Information Exchange Meeting, 7/82, Muller et al., pp. 108–113.

LA-4783-MS, 10/71, Vigil et al., pp. 1–10.

*Primary Examiner*—Harvey F. Behrend

*Attorney, Agent, or Firm*—Hugh W. Glenn; Robert J. Fisher; Judson R. Hightower

[57] ABSTRACT

The invention teaches safety apparatus that can be included in a nuclear reactor, either when newly fabricated or as a retrofit add-on, that will minimize proliferation of structural damage to the reactor in the event the reactor is experiencing an overheating malfunction whereby radioactive nuclear debris might break away from and be discharged from the reactor core. The invention provides a porous bed or sublayer on the lower surface of the reactor containment vessel so that the debris falls on and piles up on the bed. Vapor release elements upstand from the bed in some laterally spaced array. Thus should the high heat flux of the debris interior vaporize the coolant at that location, the vaporized coolant can be vented downwardly to and laterally through the bed to the vapor release elements and in turn via the release elements upwardly through the debris. This minimizes the pressure buildup in the debris and allows for continuing infiltration of the liquid coolant into the debris interior.

9 Claims, 10 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SAFETY APPARATUS FOR NUCLEAR REACTOR TO PREVENT STRUCTURAL DAMAGE FROM OVERHEATING BY CORE DEBRIS

CONTRACTURAL ORIGIN OF THE INVENTION

The United States Government has rights in this invention pursuant to Contract No. No. W-31-109-ENG-38 between the U.S. Department of Energy and the University of Chicago representing Argonne National Laboratory.

This is a continuation of application Ser. No. 472,368 filed Mar. 4, 1983, now abandoned.

BACKGROUND OF THE INVENTION

A nuclear reactor generally has a vessel within which a reactor core is positioned and primary coolant flows. Commercial reactors commonly use water as the primary coolant, although reactors are operative where liquid metal sodium is used as the primary coolant. The reactor core itself has a large network of elongated passageways and nuclear fuel in the form of elongated fuel pins is located within certain of the respective passageways according to a specific cross sectional array. Neutron absorbing elements are likewise formed as elongated members and are positioned in certain of the other passageways, again according to a specific cross sectional array. The precisely defined matrix between the various fuel pins and neutrons absorbers and the controlled extent of lateral overlap or relative degree of presence of each within the matrix determine the extent and rate of the nuclear fission in the reactor core. Control rods extending into the reactor vessel are used to move the fuel pins and/or the neutron absorbers axially relative to one another to achieve the intended control overlap.

The primary coolant is forced through the reactor core passageways and directed then by appropriate piping or line means to heat exchangers, wherein a different or secondary coolant removes the heat from the primary coolant. The primary coolant in turn is circulated back to the reactor vessel for passage again through the reactor core passageways. The secondary coolant, generally pressurized water, is vaporized and this high pressure steam is expanded through steam driven turbines which power generator equipment that produces useful electrical energy.

The fuel pins might commonly be formed of a uranium oxide or plutonium oxide, cladded with a durable material such as zirconium or stainless steel; and the reactor core itself might be fabricated of stainless steel. The reactor vessel immediately below the reactor core typically has a gridwork therein for directing the primary coolant upwardly from an underlying plenum space into and through the passageways of the reactor core. Pumps of course normally would force the coolant into the plenum.

In the event the reactor should malfunction and begin to overheat, the possibility exists that the fuel pins or the cladding on the fuel pins might fracture and/or melt and interact with the coolant to form small particles of nuclear debris which would drop or fall then through the coolant to the underlying gridwork or reactor vessel. The nuclear debris could reach significant heights, as measured in terms of centimeters, and represent the problem within which this invention is directed.

The cause of overheating or malfunction could be reduced circulation of the coolant, even though the entire plenum may yet be, and very frequently will be, filled with the liquid coolant. The nuclear debris will be highly radioactive and thus will generate heat having a high heat flux. The coolant directly overlying the debris will cool at least the exterior particles of the debris, and convective circulation within the plenum space will normally be sufficient to keep the coolant at the debris surface in the liquid phase. Inasmuch as the coolant cannot rapidly get to all of the interior particles of the debris because of the torturous or long flow paths the coolant must take to reach these particles, the coolant frequently can be vaporized only slightly below the debris surface. The vaporized coolant normally moves upwardly through the overlying particles in the pile, and thus further hinders liquid coolant penetration into the debris interior for cooling the particles thereat. This depletion of coolant toward the interior of the debris allows localized "pile dryout", where temperatures up to possibly even 3000° C. can be generated. These dryout temperatures generally exceed the design limits of the structural materials forming the reactor vessel and cavity, which thus could be structurally damaged. Destruction of the reactor vessel and the containment vessel, could lead to the escape of the coolant and the nuclear debris from such confinement, which in turn could allow the release of detrimental radioactivity to the environment and its resultant threat to public safety. Repairs of the reactor would, of course, also be most costly.

SUMMARY OF THE INVENTION

This invention relates to a safety feature to be incorporated in a nuclear reactor so as to minimize the extent of damage that might otherwise occur in the event of a reactor overheating malfunction, such as the structural failure of reactor components and the subsequent possible detrimental and unsafe release to the atmosphere of radioactive emission or the like.

A basic object of this invention is to provide apparatus which can be incorporated directly into the reactor, either during its initial construction or as a retrofit add-on to an existing reactor cavity, that would provide effective cooling of nuclear debris generated because of the partial destruction of the nuclear fuel pins and/or the reactor core itself as a result of an overheating malfunction of the reactor. In such an accident scenario, the debris would normally pile up in the reactor and generate heat sufficient to melt through or destroy the reactor vessel and/or reactor containment structure and allow thereby the escape of the coolant and debris from such containment whereby radioactive emission could be discharged also to the ambient atmosphere.

A specific object of this invention is to provide a porous bed in the reactor vessel and/or in the containment vessel or cavity, generally underlying the reactor core, such that any nuclear debris generated in and discharged from the core will fall upon and pile up on the bed. A plurality of elongated porous vapor release elements upstand from the bed at laterally spaced locations, terminating at their lower ends within the beds and at their upper ends sufficiently above the bed to remain exposed even when debris may fall onto the bed. The porous bed allows lateral transfer of coolant vapor through it from one location to another, and the porous vapor release elements allow vapor to pass therethrough axially along their length from within the bed to above the debris. In this manner, liquid coolant overlying the nuclear debris can readily circulate by gravity into the interior of the debris, and any coolant vapor generated because of the high heat flux of the debris can escape downwardly to the bed and then laterally within the bed and through to the adjacent upstanding vapor release elements, so as to preclude localized pile dryouts in the accumulated debris.

DETAILED DESCRIPTION OF THE INVENTION

Figure 1:
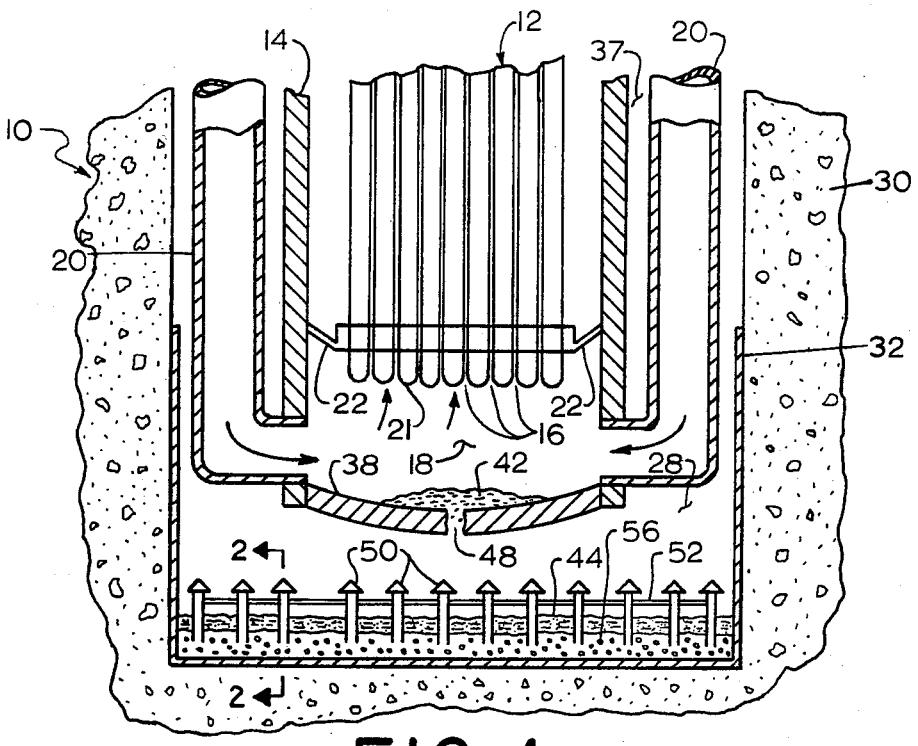
FIG. 1 is an elevational cross sectional view of a reactor, illustrating the core and its containment structure, and showing a preferred embodiment of the subject invention incorporated therein.
Figure 10:
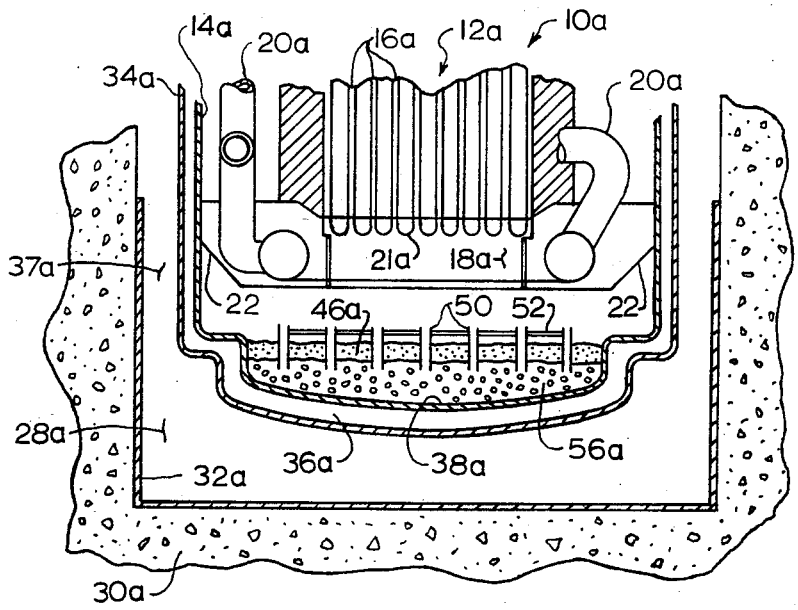
FIG. 10 is an elevational cross sectional view, similar to FIG. 1, except showing a modified reactor design and a different embodiment of the invention.

FIGS. 1 and 10 each schematically illustrates a nuclear reactor 10 (10*a*), the reactor having having a core 12 (12*a*) disposed within a closed vessel 14 (14*a*)—only the bottom portion of each being shown, the core 12 (12*a*) having vertically extended passageways 16 (16*a*) within which fuel elements and control elements (neither being shown) are positioned. A plenum space 18 (18*a*) is defined within the vessel 14 (14*a*) underlying the reactor core 12 (12*a*), and inlet pipes 20 (20*a*) allow for conveying the primary coolant to the plenum space. Pump means (not shown) circulate the primary coolant upwardly from the plenum space 18 (18*a*) through the core passageways 16 (16*a*) to a heat exchanger (not shown) wherein the heat of the nuclear reaction in the core 12 (12*a*)is given off to the secondary coolant. As noted above, the secondary coolant is generally in the form of steam that is expanded through turbine-like expansion means to generate electrical power. Gridwork structure 21 (21*a*) located in the plenum 18 (18*a*) directs the coolant upwardly and into the defined core passageways 16 (16*a*); while support structure 22 (22*a*) suspends the core 12 (12*a*) from and within the reactor vessel 14 (14*a*).

The reactor 10 illustrated in FIG. 1 is typical of a water-cooled reactor (LWR), where the reactor vessel 14 is located within a reinforced containment or cavity 28, having walls 30 formed of concrete and a steel liner 32 surrounding the lower part of the reactor vessel 14. The primary coolant could be in the form of water confined under a high pressure (2000 psi). The reactor 10*a* illustrated in FIG. 10 might be a liquid metal cooled reactor (LMFBR), where the reactor vessel 14*a* is generally confined in a larger guard vessel 34*a* which in turn is located then in the reactor containment or cavity structure 28*a* having the concrete walls 30*a* and steel liner 32*a*. The primary coolant would be in the form of sodium confined at approximately one atmosphere of pressure which at the intended operating temperatures of between 250° and 550° C. is in the liquid phase. The space 36*a* between the reactor and guard vessels (14*a* and 34*a*) and/or space 37 (37*a*) between the reactor vessel and containment structure 14 and 28 (34*a* and 28*a*) can be maintained under an inert gas atmosphere that can be monitored to detect any change in this atmosphere so as to detect or confirm if a malfunctioning leak has occurred.

The reactor vessel 14 (14*a*) id designed of sufficient strength to withstand both normal and malfunctioning pressures and/or temperatures of the operating reactor, but the wall 38 (38*a*), particularly on existing reactors, underlying the core 12 (12*a*) may not be of such durability to withstand the emergency malfunctioning scenario to which this invention is directed. Even the containment structure 28 (28*a*), which has been fabricated, even on existing reactors, as one of the last containments to keep the reactor fuel and coolant components enclosed in order to preclude the release of radioactive or otherwise harmful emission, could always be attacked at the high temperatures of 3000° C. to release gases such as carbon dioxide and steam and further could also be disintegrated under this attack into its formative components.

Reactor overheating might be caused by excess generation of heat because of runaway fission, or by a reduction in the effectiveness of cooling, because of defective coolant pump means (not shown) or blockage of the coolant flow paths, as possibly by a failed fuel pin swelling within the core passageway 16. In the destructive overheating scenario, the generated nuclear debris from the the fuel pins and/or core 12 (12*a*) drops through the coolant and collects as a debris pile or layer on an underlying horizontally disposed surface near or at the bottom of the reactor vessel. In FIG. 1, one layer is illustrated at 42 within the vessel 14 and a second layer 44 is illustrated in the containment cavity 28; while in FIG. 10, only layer 46*a* is illustrated in the vessel 14*a*. Localized melting or destruction of the reactor vessel wall 38 caused by the heat generating nuclear debris would result in failure of the reactor vessel (as shown by the opening 48 in the wall) and subsequent dumping of the debris and coolant onto the containment cavity floor. In FIG. 1 therefore, a serious accident has already occurred to the extent that the reactor vessel 14 has failed and the coolant and nuclear debris has escaped to the containment cavity 28; while on the other hand, the illustration of FIG. 10 shows the nuclear debris yet confined within the reactor vessel 14*a*.

The nuclear debris could go through several cycles of melting and quenching by the liquid coolant resulting in the debris being in the form of particles ranging anywhere from 0.01 to 10 mm in size. The phenomena of dryout can occur even when the pile of debris is completely covered by the coolant, if the heat generating capacity at some interior location of the pile is greater than the heat needed to vaporize the coolant that can filter through the outer portions of the pile and reach the pile interior. Thus, if the heat flux inside the pile is sufficient to vaporize the local coolant, vapor then rising through and from the pile adds to the resistance of the coolant filtering into the interior of the pile; whereby the heat buildup is self generating and expanding. Under such a runaway scenario, the pile temperature at some interior location could exceed 2500°-3000°

C., well above the temperature the structural material of the reactor can withstand before being destroyed or melted.

The invention teaches the use of a plurality of separate elongated vapor release elements 50 that are arranged as an array across the bottom of the reactor cavity underlying the reactor vessel (FIG. 1) or across the bottom of the reactor vessel underlying the reactor core (FIG. 10). Each element would have a height sufficient to exceed the height of any pile or layer of debris that may accumulate in the area. The elements are fabricated in a manner to be porous to allow vapor to travel axially along the length of the element from below the debris to the open space above the debris. This allows the vapors to escape upwardly from the interior of the debris pile or layer, which thereupon allows the liquid coolant to enter the debris rapidly from above and penetrate through the debris particles to wet or cool the interior portions of the debris. This maintains the debris pile within the relatively cool temperature limits of the coolant in the liquid phase.

Figure 3:
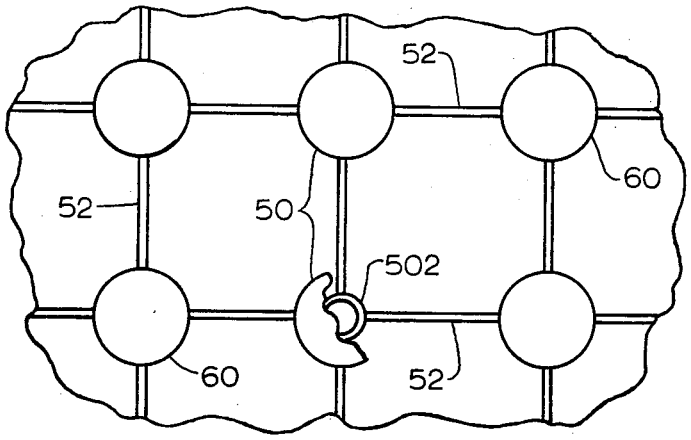
FIG. 3 is the top plan view of the vapor release elements illustrated in FIG. 2.

As illustrated, the elements are secured together by tie rods 2, one set being located adjacent the upper end of each element and possibly also a second set (not shown) being located adjacent the lower end of each element. As thus supported, the vapor release elements are vertically oriented and horizontally spaced from one another according to some selected matrix arrangement, such as illustrated in FIG. 3 in the squared array, and can be on perhaps center-to-center spacing of between 75 and 300 mm. The vapor release elements are designed to be held in this arrangement both during normal operation of the reactor and in the event of reactor malfunction where core debris particles may fall onto the vapor release elements.

In the preferred embodiments, a porous bed 56 (56*a*) is initially laid on the floor of the containment cavity 28 (FIG. 1) or on bottom wall 30 of the reactor vessel 14*a* (FIG. 10). The bed preferably is formed of a plurality of solid or imperforate ball-like elements that are randomly stacked on one another while leaving a void fraction ranging from 0.25 to 0.75. The elements can be spherical balls of either steel or ceramic material, for example, ranging in size from 1 to 20 mm; and the overall depth of the bed could be in the range of 50 to 500 mm.

The vapor release elements, in one series of embodiments, would be tubes of solid side wall construction inserted to a depth of 10 and 50 mm in the porous bed. The tube wall can also be made porous by slotting it or by drilling holes through it at relatively close spacings. The lower end of the vapor release element would be open to allow vapors to breathe into the element from under the bed.

Figure 8:
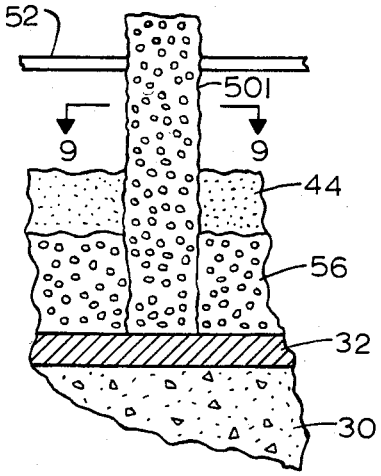
Figure 9:
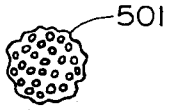
FIG. 9 is a sectional view as seen from line 9—9 in FIG. 8.

In an alternate embodiment (FIGS. 8 and 9), each vapor release element 501 might be formed of porous material such as a sintered metal or a ceramic baked or glazed to be self-supporting and structural. The entire element could have a generally homogeneous cross section from end to end, and have a porosity equivalent to the inert packed particles with 0.25 to 0.75 void fraction.

Figure 2:
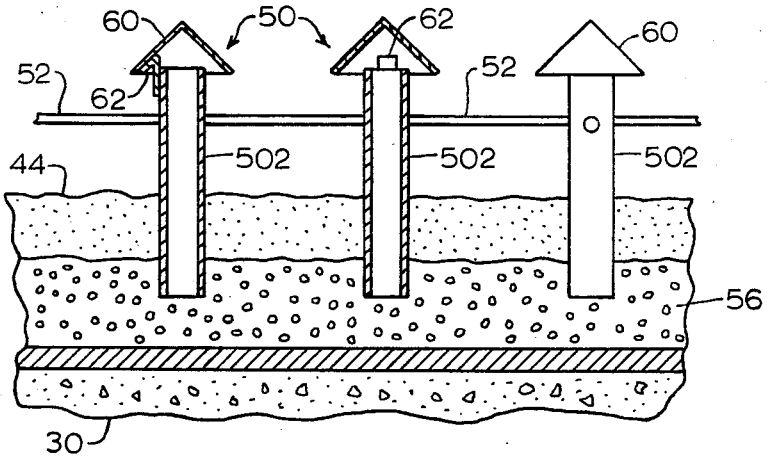
FIG. 2 is an enlarged sectional view, as seen generally from line 2—2 in FIG. 1, illustrating one embodiment of the vapor release elements, where for clarity of disclosure, two of the three illustrated elements are in slightly different sectional orientations and the third element is in elevation.
Figure 4:
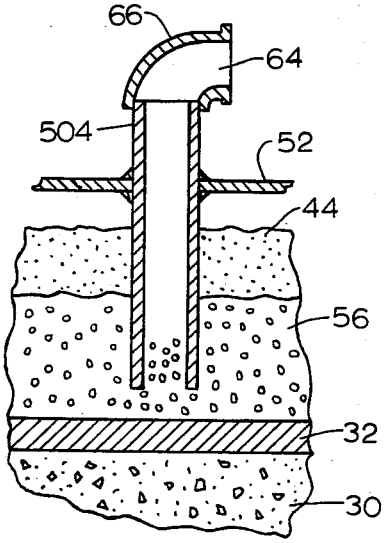
FIGS. 4, 5, 6, 7 and 8 are elevational sectional views, similar to FIG. 2, except showing different embodiments of the particular invention.
Figure 5:
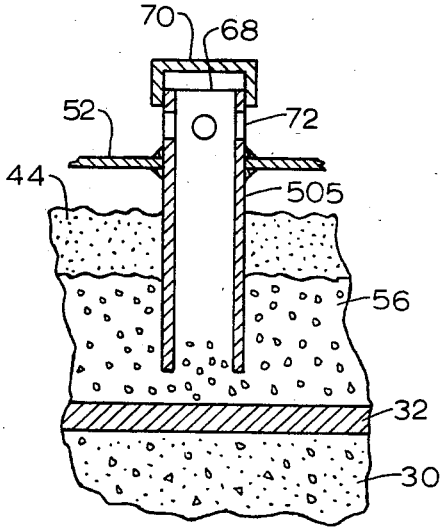

It is noted that the upper end of the hollow solid wall tubular vapor release element 50 is arranged to preclude the possibility of any debris particles from entering into the hollow interior of the tube via the open top end. In one embodiment illustrated in FIGS. 2 and 3, an inverted cone 60 is supported by structural arms 62 as a roof spaced from but overlying the top of the tube structure 502. Alternatively, the upper end 64 (FIG. 4) of the tube may be oriented laterally or possibly even downwardly by having an elbow 66 secured to the tube, so as to make it difficult or unlikely that falling debris will enter into the open tube end. Still further, the upper open end 68 (FIG. 5) of the tube 505 may be closed by end cap 70; the tube wall then having small openings 72 defined therein to give porosity to the tube end.

Figure 6:
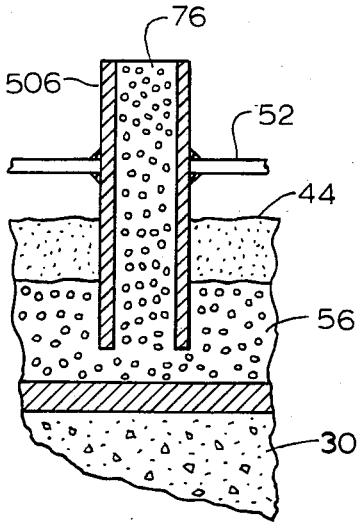
Figure 7:
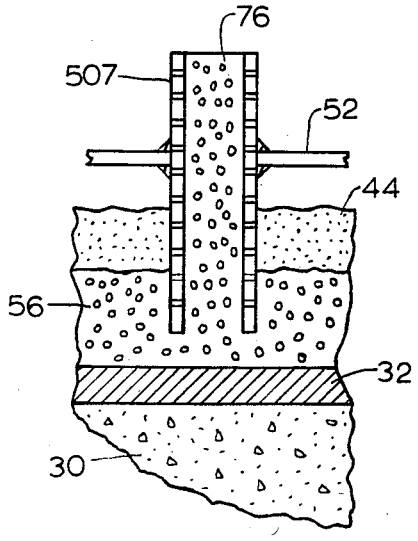

A further alternative embodiment provides that nonstructural loose particles 76 (FIG. 6), such as the same loose ball or particle structure that forms the bed 56, be located within the hollow of the structural tube 506, stacked randomly on one another to leave multiple flow paths therein for the passage of the vapor between the particles. This would yet allow the vapor to escape up the hollow interior of the structural tube 506. Also, holes or slots 78 (FIG. 7) can be formed in the wall openings of the tube 507, of size smaller than the particle 76 to preclude them from falling out through the openings; thus providing a porosity to the side wall of the tube 507 itself. The particle 76 in the open top tubes 506, 507 would effectively preclude any of the debris from entering into the interior of the tube.

The bottom ends of the upstanding porous elements can rest directly on the horizontally disposed debris collection surfaces (where the nuclear debris would more than likely tend to accumulate) or be supported spaced off of the surface by the particle bed disposed within the reactor vessel.

As noted, the tube construction need not have porous side walls but the tube can have impervious side walls and the tube interior communicate with the open end of the tube disposed below the bed. Thus, by locating the end of the tube within the bed, vapors in the bed can breathe through the tube interior and escape from the bed through the overlying layer or pile of debris. Under such circumstances, when debris collects on top of the bed, the porous bed laterally conveys any generated coolant vapors to the vapor release elements and the elements in turn vent the vapors through the debris.

With this bed configuration, the degree of porosity can be very closely regulated by the depth of the bed and further by the size and shape of the balls or elements forming the bed. Spherical balls are ideal vehicles for forming the bed as they can be randomly stacked or dumped on one another to the desired depth while yet having many well-defined flow paths between the adjacent faces of the balls throughout the depth of the bed. While the bed and vapor release elements are illustrated in one embodiment in the containment vessel and in the other embodiment in the reactor vessel, they could be provided in both vessels if desired. Thus, unless specifically identified differently, the term reactor confinement in the claims is intended to cover either vessel.

By way of example, preliminary tests of a simulated pile of nuclear debris indicate vastly improved cooling rates that are 1.2–24 times greater than where no vapor release elements were used. Table 1 summarized experiments in which a mixture of stainless steel and nickel particles, of screened sizes between 0.1 and 1.0 mm, was used to simulate the heat generating nuclear debris, the particles being internally heated by a 15-kW high frequency induction furnace. Glass balls were used to simulate the inert bed or sublayer, and various liquid coolants were used. Heat flux of dryout rates, Q, were determined by the condensation rate of the vapor in a condenser, and temperatures were determined by thermocouples in the debris particles. Dryout heat fluxes higher than in the order of 950 kW/m$^2$ were beyond the capacity of the experimental apparatus and could not be measured accurately. Comparison of the dryout heat fluxes with the components of the invention against those without demonstrate the substantial improvement that the invention makes in maintaining the debris pile or layer cool and in otherwise avoiding the generation of localized pile dryouts.

These experiments also confirm that the vapor release elements used in conjunction with the porous bed below the heat generating debris allow coolant vapor generated in the debris to move downwardly into the bed and then laterally through the bed to the vapor release elements and then upwardly through the vapor release elements. This is an unexpected phenomenon, and results in higher allowable dryout fluxes and therefore provides for greater margins for containment of heat generating debris.

These improved cooling rates are substantial and quite significant, particularly when comparing the cost of implementing the invention against the possible dangers of failure and the costs of repair, when the improved cooling might not be available and the reactor malfunctions.

TABLE 1

EFFECT OF TUBES ON DEBRIS BED DRYOUT
Screened 0.1 mm to 1.0 mm Stainless Steel and Nickel Particles
Glass Ball Bed of Depth: 50 to 75 mm
Solid Wall Tubular Vapor Release Element: Glass
Porous Vapor Release Element: 9.5 mm OD Stainless Steel 170 mesh

| Vapor Release Element | Glass Ball Dia., mm | Debris Depth mm | Coolant | Average Measured $Q_{dryout}$ kW/m$^2$ | Comparative $Q_{dryout}$ kW/mm$^2$ | Ratio $\frac{Q_{with\ tube}}{Q_{without\ tube}}$ |
|---|---|---|---|---|---|---|
| None | No Bed | 150 | water | 148 | 148 | — |
| Porous Mesh | No Bed | 150 | water | >914 | 148 | 6.2 |
| Porous Mesh | No Bed | 200 | water | 967 | — | — |
| None | 5 | 150 | water | 102 | 102 | — |
| Solid Wall 3 mm I.D. | 5 | 150 | water | 277 | 102 | 2.7 |
| None | 3 | 100 | water | 265 | 265 | — |
| Solid Wall 9 mm I.D. | 3 | 100 | water | 913 | 265 | 3.4 |
| None | 3 | 100 | water-ethylene glycol | 223 | 223 | — |
| Solid Wall 5 mm I.D. | 3 | 100 | water-ethylene glycol | >956 | 223 | 4.3 |
| None | 3 | 100 | water-glycerine | 40 | 40 | — |
| Solid Wall 5 mm I.D. | 3 | 100 | water-glycerine | >960 | 40 | >24 |
| None | 3 | 100 | isopropyl alcohol | 70 | 70 | — |
| Solid Wall 9 mm I.D. | 3 | 100 | isopropyl alcohol | 143 | 70 | 2.0 |
| Porous Mesh | No Bed | 100 | isopropyl alcohol | 144 | 70 | 2.1 |
| None | 3 | 150 | isopropyl alcohol | 68 | 68 | — |
| Solid Wall 9 mm I.D. | 3 | 150 | isopropyl alcohol | 83 | 68 | 1.2 |
| Porous Mesh | No Bed | 150 | isopropyl alcohol | 104 | 68 | 1.5 |
| Porous Mesh | No Bed | 200 | isopropyl alcohol | 116 | 116 | — |

The embodiments of the invention in which an exclusive property or privilege is claimed are defined as follows:

1. A nuclear reactor comprising a core and a confinement vessel surrounding the core, fuel means in the core, liquid coolant for circulating over the fuel means and through the core, and a apparatus within the confinement vessel for minimizing structural damage to the reactor in the event of a reactor overheating malfunctioning accompanied by discharge of debris from the core, said apparatus comprising a bed of particles with diameters essentially in the range of 1–20 mm, on a lower surface in the containment vessel and located beneath the reactor core, the bed being porous to allow vapor to be passed laterally through it, and a plurality of elongated, tubular elements, each having an interior passageway, disposed with the lower ends thereof terminating within the porous bed and the upper ends, thereof terminating in the reactor confinement at an elevation above the bed of particles but beneath the reactor core whereby vapor can be vented from the porous bed.

2. The nuclear reactor of claim 1 wherein the safety apparatus includes a plurality of tie rods secured to the elongated tubular elements adjacent their upper ends operable for supporting the elements in a lateral array.

3. The nuclear reactor of claim 1 wherein the safety apparatus includes means for precluding falling debris from entering the elongated tubular elements while allowing passage of coolant vapor.

4. The nuclear reactor of claim 3 wherein the precluding means includes means for covering each elongated tubular element at the upper end thereof to preclude debris from falling therein.

5. The nuclear reactor of claim 4 wherein said covering means is in the form of an elbow secured to the elongated tubular element over the upper end thereof operable to define a sidewardly disposed opening from the interior passageway of the tubular element.

6. The nuclear reactor of claim 4 wherein said covering means is in the form of a cap secured to the elongated tubular elements has a plurality of holes therein near the cap that define sidewardly oriented openings from the interior passageway of the tubular element.

7. The nuclear reactor of claim 4 wherein said covering means is in the form of a plurality of a small particles randomly stacked on one another within the interior passageway of the elongated tubular element.

8. The nuclear reactor of claim 7 wherein said particles define a void fraction of the order of between 0.25 and 0.75.

9. The nuclear reactor of claim 8 wherein said particles are of about the same size, shape and material as the particles forming the bed in the confinement vessel.

* * * * *